May 21, 1929.   W. A. KOSKEN   1,713,663
MOTION PICTURE APPARATUS
Filed June 26, 1925   4 Sheets-Sheet 1

INVENTOR.
Wilho A. Kosken
BY Jas. H. Griffin
ATTORNEYS.

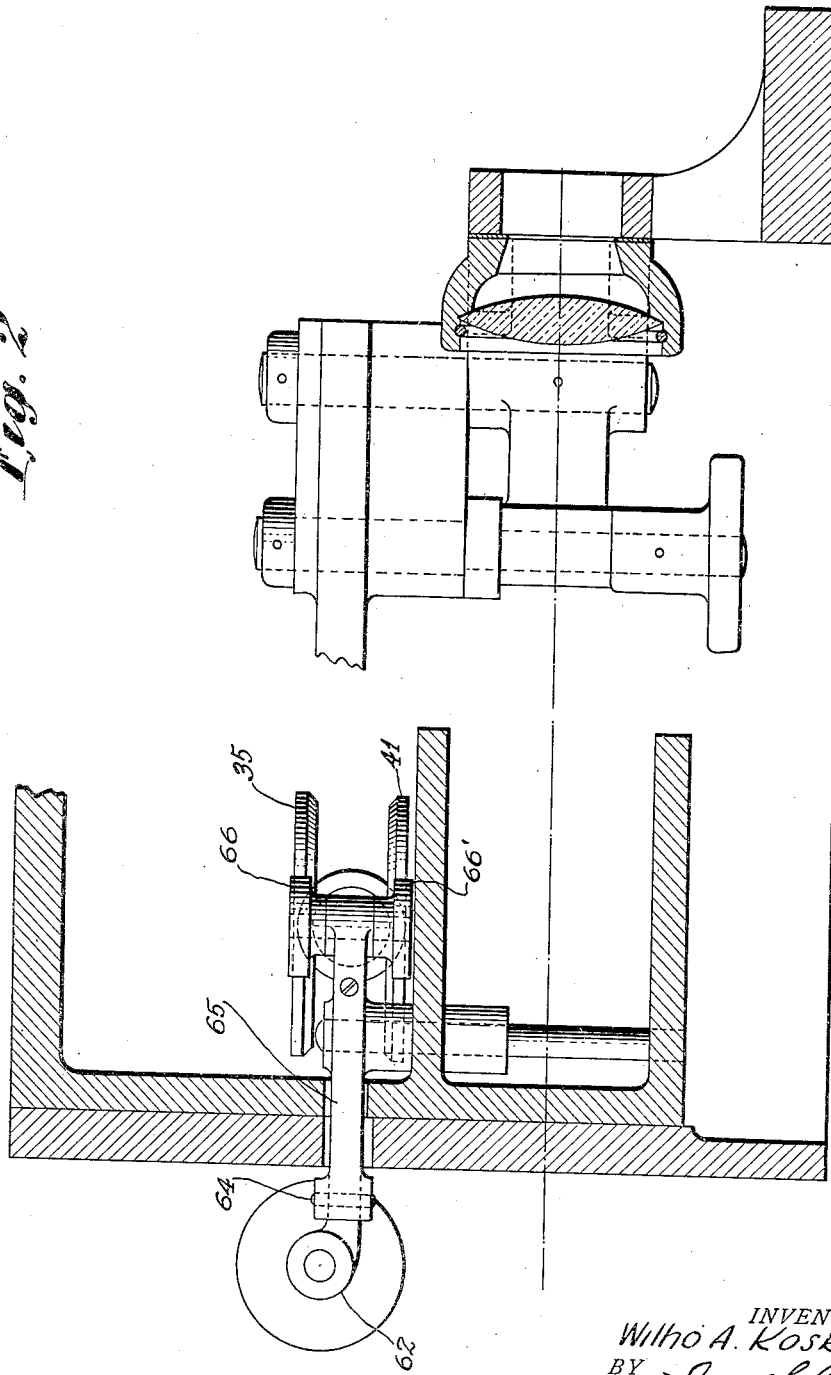

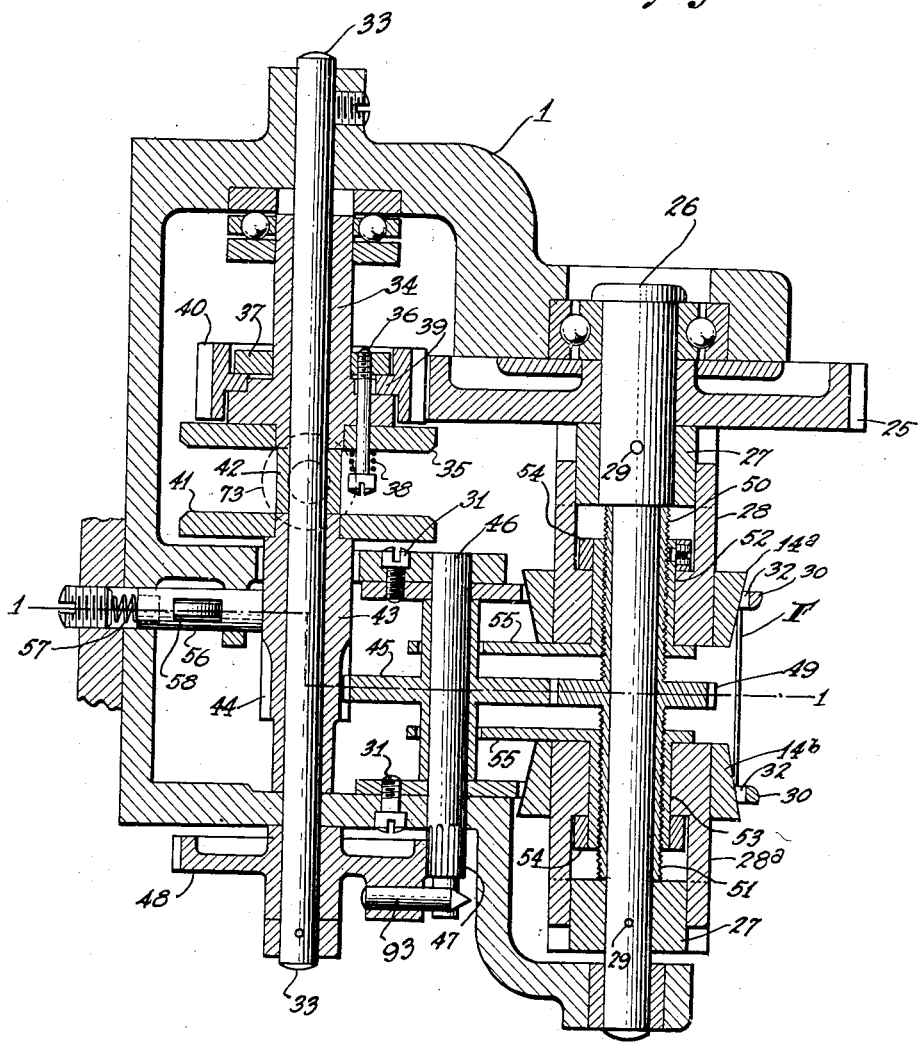

Patented May 21, 1929.

1,713,663

UNITED STATES PATENT OFFICE.

WILHO A. KOSKEN, OF NEW YORK, N. Y., ASSIGNOR TO STEADYLITE MOTION PICTURE MACHINE CORPORATION, OF NEW YORK, N. Y., A CORPORATION OF NEW YORK.

MOTION-PICTURE APPARATUS.

Application filed June 26, 1925. Serial No. 39,660.

This invention relates to the art of motion pictures and is primarily directed to an apparatus for synchronizing the movement of a motion picture film with the operations of moving deflectors. The invention is particularly intended for use in motion picture machines of the character which employ a plurality of series of moving deflectors for bending the beam a plurality of times during the transmission of such beam between the film and objective or vice versa. In machines of this character, the deflectors of the respective series move along predetermined paths so that in the projecting machine the deflectors of one series successively move into cooperation with the transmitted beam passed through the film and deflect said beam upon the deflectors of another series, which latter deflectors move successively into cooperation with said beam for the purpose of further bending it and directing it through the objective lens.

It is of primary importance in machines of this character, that the movements of the film be synchronized with the movements of the deflectors, otherwise dark lines will show upon the screen and produce very unsatisfactory optical effects.

Although, this fact has been generally recognized, no satisfactory means has heretofore been produced or suggested for remedying this defect. In practically every instance, synchronization has been attempted by a manual adjustment of the film drive in an attempt to drive the film at such speed that it will synchronize with the movements of the deflectors. Heretofore the film drive means has been positively geared to the means which positively drives the deflectors and synchronization has been attempted by manually effecting changes in the relationship of speed of these drive means, so that the film will run faster or slower as the operator may think desirable.

It is found in practice, however, that films vary considerably in the distance between images and marked differences may be found in the same film. That is to say, one part of the film may vary considerably in the distance between images or "pitch", as well as regards the sprocket holes of the film. These defects may result from careless cutting of the sprocket holes or from unequal expansion or contraction of the film due to atmospheric conditions, or wear on the film, but the fact remains that such variations are common and are found in practically every film. It is thus apparent that any attempt to manually compensate for these irregularities is futile, and the absence of any means for automatically effecting a proper synchronizing of the film and deflectors has, up to the present time, caused this type of machine to be considered impractical.

It will of course be understood that with the manual operable adjustments to which I have referred, the sprockets which drive the film will attempt to correct improper spacing of the sprocket holes of such a film, but the result of such an operation will cause excessive wearing of the film and not infrequently result in actual breakage thereof.

With the foregoing considerations in mind, and as a result of the most exhaustive and careful experimentation and study, I have conceived novel means for automatically synchronizing the movements of the film with the movements of the deflectors, in such manner that these parts will be absolutely synchronized in an entirely automatic manner and without requiring manual intervention. Any attempt to manually effect this result cannot be successful, because of the variations to which I have referred and inasmuch as it is a properly centralized beam of light which is desirable, I utilize, in the preferred manner of carrying out this invention, the beam of light passing through the machine as the controlling medium for the automatic synchronization of the parts. As long as the parts are properly synchronized, the image projected on the screen will be free of the dark shadows or lines referred to and the apparatus will function continuously and without requiring adjustment until irregularities in the film occur, whereupon the resulting discrepancy in the image of the beam will immediately bring about an automatic resynchronization of the parts by causing such speeding up or slowing down of the film as is required to give the desired results.

It should be borne in mind in this connection that when a beam of light is projected or passed through a film, all portions of the beam beyond the film include the image. That is to say, the beam, impinging upon the screen at any point in its length, will cast an image upon the screen. In order to project without the dark shadows to which I have referred, the axis of this image in or of the beam should pass through the lens in a centralized relation to said lens, i. e., substantially coaxial with the principal axis of the lens. The dark shadows or lines are the result of improper feed of the film which occasions the projection of the beam through the objective lens in such manner that the axis of the image in the beam is not substantially co-axial with the principal axis of the lens, or, in other words, that the image in the beam is not centralized with respect to the objective lens.

It thus becomes apparent that by controlling the synchronizing of the parts by said beam itself, the slightest discrepancy in the beam will bring about automatic re-synchronization of the parts to return the image in the beam centralized relation with the lens.

While the invention may partake of various forms, I have chosen, for the purpose of illustration, to show the driving means for the deflectors and the film as geared together for positive operation, but I have interposed within these driving connections, means governed by the emitted beam for controlling the relative speeds between said parts, so that an automatic speeding up or slowing down of the film necessary to produce the centralizing of the beam image is effected in an entirely automatic manner.

The beam is passed through the film and by way of the deflectors to the objective lens, and preferably between the objective lens and next adjacent series of deflectors is caused to pass through a constricted opening, so that a part of the beam impinges the wall of said opening at either side thereof. In the preferred form of the invention, that portion of the beam which impinges said walls is diverted, deflected or reflected in any suitable manner to play upon electrical resistance variable by differences in degree of light intensity. For example, and without limiting the invention to any specific substance, selenium may be employed. Broadly stated, this resistance material may form part of a photoelectric cell. A plurality of these cells is preferably employed and the cells associated with one side of the constricted openings are adapted to effect a normal balancing of the current, with respect to the photo-electric cell or cells at the other side of said opening. All of the cells are wired to effect an electric control of the means which is interposed between the deflector driving means and the film driving means. If the film is operating at too great a speed, the cells will be thrown out of balance in one direction and the film will accordingly be slowed down, while if the film is operating at too slow a speed the cells and their associated circuits will be thrown out of balance in the opposite direction for the purpose of effecting a speeding up of the film. The actual electrical connections and operating means for producing this result may, manifestly, vary within wide limits for, so far as I am aware, this invention is absolutely the first to effect an automatic synchronization of the parts under consideration.

The present invention effects a synchronizing of the speed of the film to the speed of the deflectors in a very smooth manner entirely devoid of quick jerks or shocks which would tend to disrupt the film. Moreover, the speed of the film is synchronized so that it is slowed down or speeded up smoothly and gradually, at the very instance when such discrepancies may occur. This is highly important, since the wear and tear on the film is eliminated and the film will last much longer in a machine embodying this invention than in any manually controlled machine or in any machine which has no control at all. Furthermore, I do not consider the use of sprocket holes and a positive drive of the film essential to this invention.

In all prior constructions which do not embody any automatic compensation for slippage, irregularities, etc., a positive drive is essential, but it will be apparent that inasmuch as the present invention enables an automatic synchronization of the parts by the emitted beam, that the parts may be properly synchronized without a positive drive, so that the film may be driven frictionally or otherwise in a thoroughly practical manner. Perforations weaken the film and by eliminating them, the life of the film is considerably lengthened. By eliminating the perforations, the film can, moreover, be made narrower than heretofore or the width of the film may be maintained standard and the images thereon may be made larger than heretofore possible.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 2 is a section on the line 2—2 of Figure 1, certain parts being omitted in the interest of clearness.

Figure 3 is a section on the line 3—3 of Figure 1.

Figure 1:
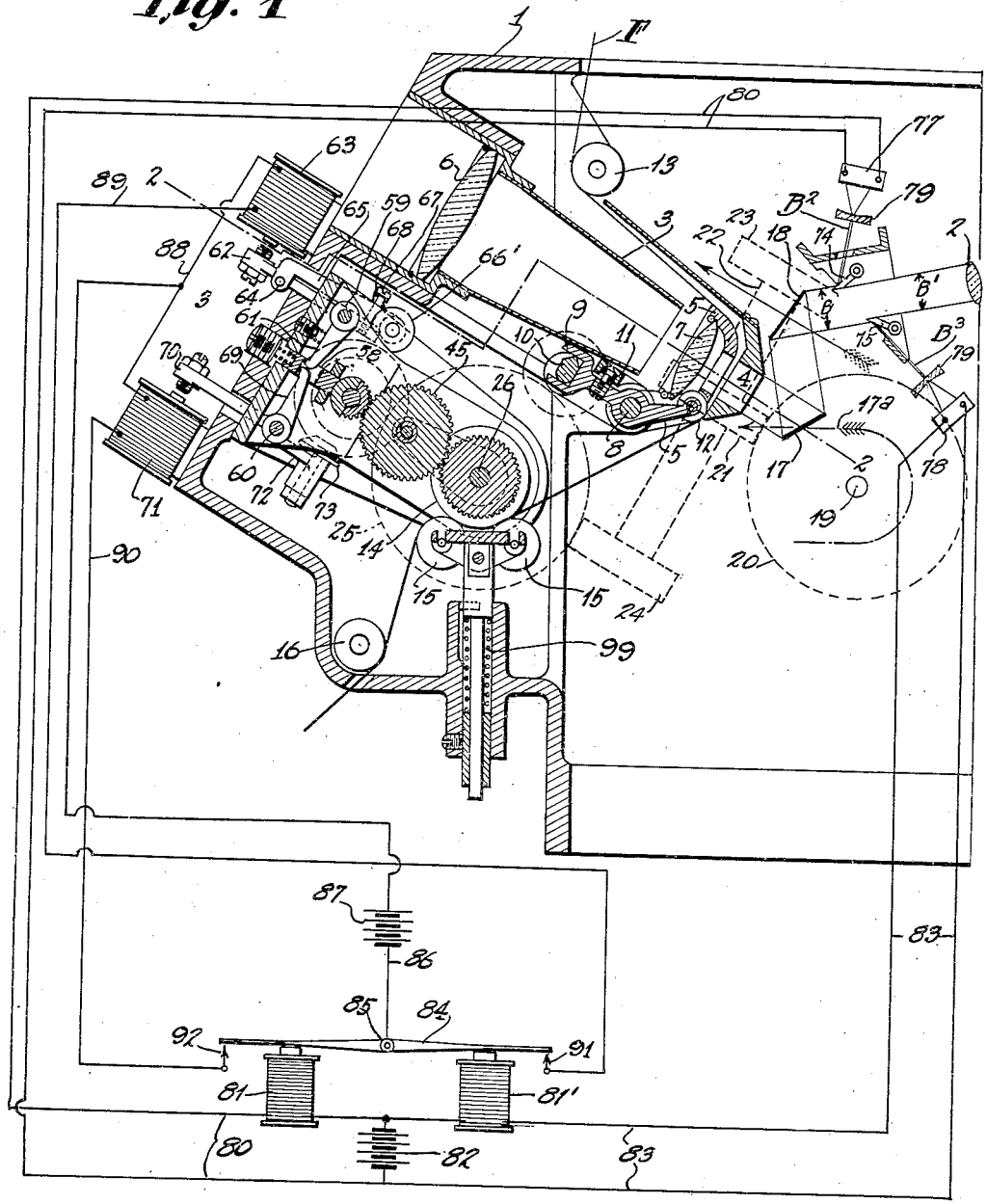
Figure 1 shows in section, on line 1—1 of Figure 3, and more or less diagrammatically, an optical machine embodying the present invention. Included in this view is a wiring diagram showing how the operations of the parts are electrically controlled.

Referring to the drawings, 1 designates a suitable framework for the machine. This framework carries an objective lens 2, a light tube 3 in line with which is a gate or aperture 4. Positioned between the end of the light tube and the aperture 4 is a film guide 5. Lenses 6 and 7 are shown as positioned in the path of the light beam projected through the light tube and the gate, although, if desired, these lenses may be omitted. As shown, the film guide 5 is pivoted at 8 and is extended beyond a pivot to form a forked or bifurcated arm 9, into the fork of which extends a cam 10. By rotating the cam, the film guide may be swung counterclockwise on its pivot 8 to retract said guide from the aperture 4 in order that the film F may be more readily threaded through the machine. A spring 11 forces the forked end of the guide against the cam 10 and bears at its opposite end in a rigid part of the frame. An anti-friction roll 12 is shown as associated with the film guide to facilitate movement of the film.

The path of the film is clearly shown in Figure 1; passes through the top of the frame and about a directional roll 13 to the gate and thence about a drive roll 14 with which it is held in contact by pressure rolls 15, and thence over a directional roll 16 and out of the frame roll 16 and out of the frame at the bottom thereof.

Light projected through the aperture 4 is adapted to impinge in succession a plurality of deflectors 17 arranged in series mounted to travel in the direction shown by the arrow so that these primary deflectors receive the beam and divert it upwardly and on to the deflectors 18 of the secondary series. These latter deflectors, of which there are several in number, move in the direction of the associated arrow and successively receive the beam from the primary deflectors and pass said beam through the objective lens 2.

A wide variety of mechanism may be utilized to support and carry the deflectors of the primary and secondary series and I have not considered it necessary to show in detail the specific form of mechanism for accomplishing this result, as different forms of such mechanism are shown in several of my copending applications. Suffice it to say that the primary deflectors move in a path 17ª and are driven at a constant speed from a shaft 19 operated from any suitable prime mover. On the shaft 19 is affixed a gear 20, which meshes with a gear 21, fixed on a shaft 22. These two gears are of the worm or spiral type, so that the gear 21 is driven from the gear 20, and, through the shaft 22 drives the gear 23, which serves to move the deflectors 18 of the secondary series in the direction of the associated arrow in Figure 1.

The gear 21 is rigid with the gear 24 which is of the spiral type and meshes with the corresponding gear 25. This gear 25 is fixed on a shaft 26 which supports the film drive roll 14.

By reference to Figure 3, it will be noted that the shaft 26 is journalled for rotation in the frame 1 and has rigid with said shaft two bosses 27. The film drive roll 14 is formed in two sections 14ª and 14ᵇ and these sections are respectively rigid with tubular sections 28 and 28ª. The tubular sections telescope over the bosses 27 and are longitudinally slotted so that pins 29 passed through the shaft will extend through said slots, to lock the tubular sections against rotation on the shaft, but to permit said sections to be moved longitudinally of the shaft.

With this arrangement, it will be manifest that power transmitted to the gear 25 will be applied to the shaft 26 for the purpose of rotating both the drive roll sections 14ª and 15ª. From Figure 3, it will be apparent that both of these drive roll sections are of frusto conical form and that the film F passes over these sections in such manner that the marginal edges of the film will engage with the respective sections of the roll. Lateral shifting of the film is precluded by means of end plates 30, which are secured by screws 31 to the frame of the machine and are provided with holes 32 through which the sections of the drive roll protrude. The film travels with its edges substantially in engagement with these end plates and is thus maintained against lateral shifting.

Inasmuch as the film is driven through contact with the sections 14ª and 14ᵇ, it will be apparent that the speed of said film can be controlled by presenting different diameters of such sections to operative engagement with the film. Thus, if the sections are moved apart, a lesser diameter of the sections will be engaged with the film and the film will be driven at a lower rate of speed. If, in contradistinction, the sections are moved in the direction toward one another, an increased radius will be presented to the film, so that the film will be driven at a greater speed. It is through the manipulation of these sections that the speed of the film is controlled and although the film is driven from the shaft 19, the speed of the film may be readily varied without varying the speed of said shaft if means is provided for adjusting the roll sections 14ª and 14ᵇ with respect to one another, as described. I will now specifically set forth the mechanism for so moving the roll sections.

Fixed in the frame 1 is a shaft 33 which is locked against rotation. On this shaft is rotatably supported the hub 34 of a friction disk 35. The disk 35 is secured by a forced fit to its hub and a plurality of bolts 36 pass through the disk and hub and thread into a collar 37. Between the disk and the head of each bolt is a coiled spring 38 which serves to draw the collar 37 into a position wherein it will serve to frictionally grip the flange 39 formed on the interior of an annular gear 40, which is in mesh with the gear 25. By this arrangement, the gear 40 is driven from the gear 25 and through the friction connection shown serves to drive the disk 35.

Also loosely mounted on the shaft 33 is a second disk 41 spaced from the disk 35 by a spacing sleeve 42. The disk 41 is rigid with its hub 43 and said hub is machined to form a gear 44. The gear 44 meshes with the gear 45 fixed on a shaft 46, which is journalled for rotation in the frame and is extended at one end and milled to form a gear 47 which meshes with a gear 48 loosely mounted on the shaft 33.

The gear 45 also meshes and serves to drive the gear 49 which is provided with relatively long threaded hubs 50 and 51. These threaded hubs extend into complementarily threaded sleeves 52 and 53, which extend through and form bearings for the tubular parts 28 and 29 and are locked against longitudinal movement by fixed collars 54. The sleeves 52 and 53 have laterally extending arms 55 which embrace the hubs of the gear 45 and thus preclude rotation of said sleeves.

56 is a brake plunger mounted for longitudinal movement in the frame and acted upon by a spring 57 to normally force the plunger into engagement with the sleeve 43, so that said sleeve is normally held against rotation. The plunger is slotted, as shown at 58, to receive a retracting element hereinafter fully described.

Extending transversely of the frame are two pivot rods 59 and 60. On the rod 59 is pivoted a bell crank lever, one arm 61 of which extends into the slot 58, and the other arm of which extends to the interior of the casing and constitutes the armature 62 of a magnet 63. Pivoted to said latter arm of the bell crank at 64 is an arm 65 which carries at its free end a pair of relatively rigid twin rolls 66 and 66', see Figures 1 and 2. A screw 67 passes loosely through the arm 65 and threads into an extension of the bell crank and a spring 68 is coiled about the screw between the head thereof and the arm 65, so as to force the twin rolls 66 and 66' in the direction of the cooperating friction disks 35 and 41. When the parts are in the position shown in Figure 1, the twin rolls will be disengaged from both of said disks, but if the magnet 63 is energized to attract its armature 62, the twin rolls will be forced under elastic pressure against the peripheries of both the disks 35 and 41 simultaneously, so as to transmit power from the disk 35 to the disk 41 in order to drive the latter in the same direction as the former. A similar bell crank is also associated with the pivot rod 60, one end of the bell crank 69 being projected into the slot 58 of the brake plunger and the other arm of the bell crank 70 constituting the armature of the magnet 71. The bell crank is provided at its elbow with an extension 72 which carries a beveled disk 73. The beveled disk is normally disengaged from the disks 35 and 41, but if the magnet 71 is energized this beveled disk will be simultaneously engaged with both gears, for the purpose of transmitting power from the disk 35 to the disk 41 and driving the latter in a reverse direction. It will be noted that when either of the magnets are energized, to engage the respective friction elements with the friction disks 35 and 41, the brake plunger will be automatically retracted so that the power thus derived can be utilized to drive the gear 44.

When the gear 44 is driven in one direction, rotation will be transmitted through the gear 45 to gear 49 to rotate the hubs of said gear in a predetermined direction. The threads of these hubs are right and left, so that when rotated in said direction, the sections $14^a$ and $14^b$ will be moved apart. In a similar manner, the rotation of the gear 44 in an opposite direction will effect reverse movement of the sections $14^a$ and $14^b$, so that they will be moved closer together.

By thus moving such sections, the driving radius will be varied, so that the film will be driven at a greater or lesser speed. In accordance with this invention, this control of the film speed, i. e., this adjustment of the sections $14^a$ and $14^b$ is effected automatically; that is to say, the magnets 63 or 71 are energized to bring the respective friction elements into cooperative relation through a control primarily effected by the light beam passing through the objective lens.

Figure 4:
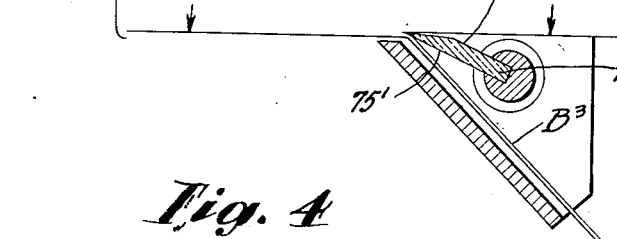
Figure 4 is an enlarged fragmental section of a part of the construction shown in Figure 1; and, Figure 5 is a wiring diagram of electrical amplification means which may be used in conjunction with the apparatus shown in the other figures.

Thus in Figure 1, the light beam as it leaves the deflectors of the secondary series is equal in height to the dimension B and it maintains this dimension until passed through a constricted opening positioned between the secondary deflectors and the objective lens and embodying two gates 74 and 75. These two gates are mounted for pivotal adjustment on manually adjustable stems 76, so that they can be swung toward and away from one another, as shown best in Figure 4, to form a slight constriction of the beam. The outer face 74' of the gate 74, as well as the outer face 75' of the gate 75 is in the form of a reflective or polished surface, so that those marginal portions of the beam which are cut off are deflected at a convenient angle, as shown at $B^2$ and $B^3$, that portion of the beam which passes between the gates being narrower than the width of the beam at B, as shown at B'.

The gates are so adjusted that when the machine is operated properly, the center of the beam will pass through the center of the gate, so that the deflected beams B² and B³ will have substantially the same intensity. As shown in Figure 1, the beam B² is directed upon a photo-electric cell 77 while the beam B³ is directed upon a photo-electric cell 78. Moreover, if desired, a suitable lens or lenses 79 may be positioned in the paths of these beams, so as to form a larger zone of illumination on the respective cells.

I do not, however, consider these lenses as essential and glass rods may be employed in lieu thereof if desired.

The photo-electric cell 77 is included within a circuit 80, which also includes a magnet 81, and a source of power 82 (see Figure 1). The photo-electric cell 78 is included in a circuit 83 which includes a magnet 81' and also the source 82. The resistance of these two circuits 80 and 83 is so adjusted that the two circuits will normally balance one another. That is to say, that the magnets 81 will have a balancing influence upon a switch arm 84 pivoted at 85 and the opposite ends of which constitute the armatures of said magnets. The switch arm 84 is connected by a wire 86, which includes a source of power 87 to a common lead 88 between the two magnets 63 and 71, while the return lead 89 of the magnet 63 and the return lead 90 of the magnet 71 pass to contacts 91 and 92, respectively, adapted for cooperation with the balance arm 84. As stated, the parts are so adjusted that after the beam is projected properly between the gates 74 and 75, so that the axis of the beam will pass through the center of the space between the gates, the balance arm 84 will be in absolute balance and will be disengaged from both the contacts 91 and 92. This condition will prevail so long as the film is travelling at the proper speed and with its rate of travel properly synchronized with the rate of speed of the deflectors. If, however, due to irregularities of the film, or otherwise, the images of the film are presented to the aperture 4 out of proper synchronism to the deflectors, then, it will be apparent that the dark opaque blind commonly found between successive images of a motion picture film, will cause a darkening of one of the photo-electric cells, while the other photo-electric cell will be illuminated with a correspondingly greater brightness.

When this occurs, the magnets 81 and 81' will be placed out of balance and will attract the balance arm 84 unequally, so as to close the circuit through the corresponding magnets 63 or 71. If it be assumed for the purpose of example that the magnet 63 is energized, its armature 62 will be attracted and the twin friction rolls 66 and 66' will be engaged with the friction disks 35 and 41. The friction disk 41 will be driven and through the gears 44 and 45 will drive the gear 49 to effect the necessary adjustment of the sections 14ª and 14ᵇ for the purpose of slowing down the feed of the film.

As soon as the proper relationship is restored, the parts will stay in the new synchronism until a further change is desired. The same general result is effected if the other magnet 71 is energized except that the beveled disk 73 will connect the disk 41 to the disk 35, so that the sections 14ª and 14ᵇ will be drawn close together and the speed of the film will be increased.

In order to preclude overtravel of this compensating means, such as might cause jamming, a gear 48 carries a pin 93 (see Figure 3) which after the shaft 46 is rotated to the maximum extent desirable, the pin will engage with said shaft as shown in this figure to lock the parts against further movement which would be detrimental. When the parts thus become locked, the friction connection between the annular gear 40 and its hub 34 will permit slippage so that none of the parts become broken.

In the manner described, the narrow supplemental beams B and B³ which are deflected off from the margins of the main transmitted beam will serve to positively control the operations of the film driving means in such manner as to synchronize the movements of the film at all times with the movements of the primary and secondary deflector series.

In Figure 1, the magnets 81 and 81' and the balance arm 84 constitute, in effect, a relay, so that a relatively weak current can be used in the circuits 80 and 83 and will operate through the relay to control a greater current from a source 87 to act upon the magnets 63 and 71.

Figure 5:
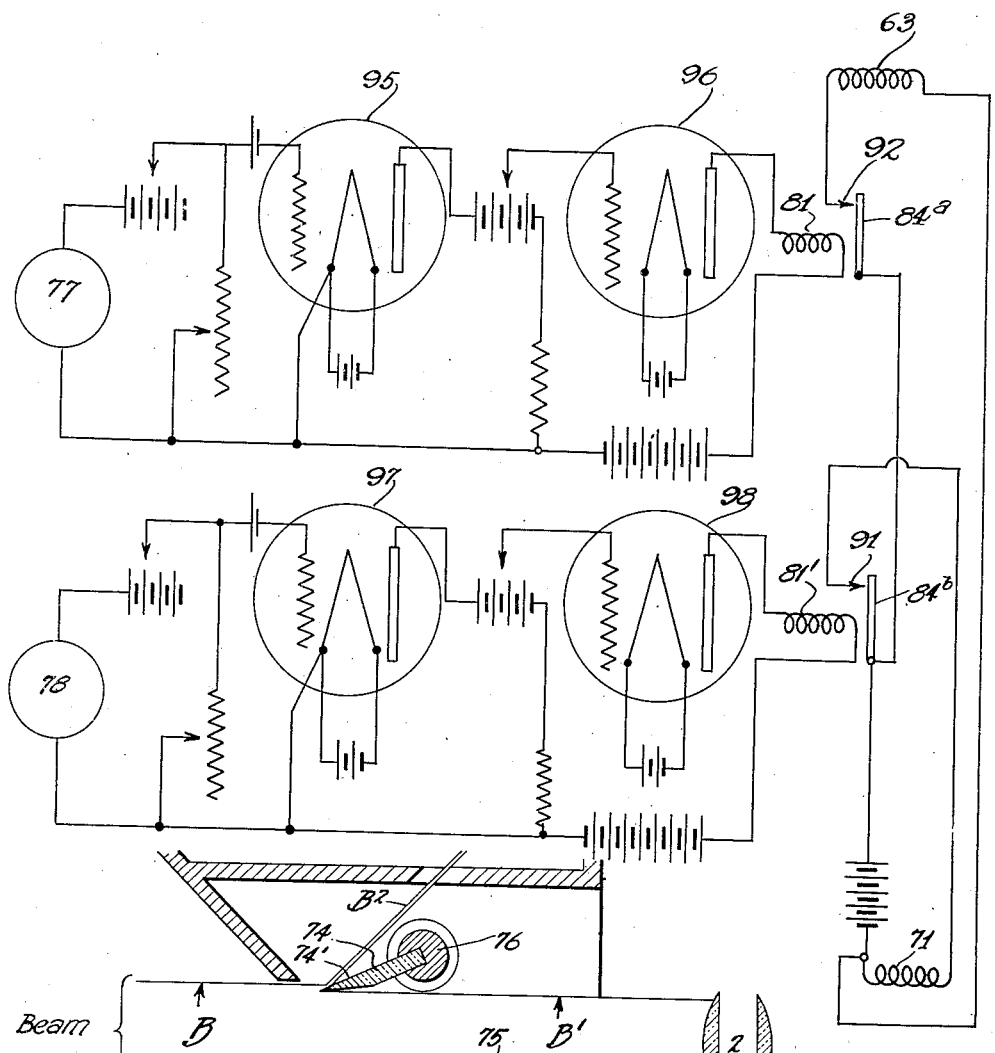

This showing of the relay in Figure 1, however, is only for the purpose of illustration and a wide variety of other electrical controls might be employed. For example, in Figure 5, I have shown a wiring diagram in which audion bulbs can be employed in this connection. In this showing, instead of coupling the magnets 81 and 81' directly in circuit with the photo-electric cells, I interpose between these parts one or more stages of amplification, two of such stages being shown. The audion bulb of the first stage in the circuit including the cell 77 is designated 95, while the audion bulb of the second stage is designated 96. The corresponding bulbs of the circuit including the cell 78 are designated 97 and 98, respectively. These bulbs are hooked up in a manner common to radio circuits to effect amplification of the variations in current controlled by the respective cells, so that the magnets 81 and 81', which are included in the respective cell circuits receive more pronounced current variations. These magnets 81 and 81' control movable switch arms 84ª and 84ᵇ, which correspond with the respective arms of the balance 84 and are adapted to be drawn by their magnets into engagement with contacts 91 and 92, which are respectively included in circuits which also include the magnets 63 and 71.

The two methods which I have described for the ultimate control of the magnets 63 and 71 are merely for the purpose of illustration and any other suitable wiring to these magnets may be employed, so long as they are energized at such times as to effect that driving relation between the friction disks 35 and 41 as is necessary to properly synchronize the speed of the film to the speed of the primary and secondary deflectors 17 and 18.

It will be apparent from the foregoing detailed description of the preferred form of the invention that both the film and the deflectors are constantly driven, the latter operating at a substantially uniform speed and the former at speeds such as will properly synchronize the operations of the parts, so that the beam passed through the objective will be of maximum efficiency and free from dark shadows or lights at its edges. In other words, with the apparatus of this invention, and in accordance with the method underlying the principle of operation thereof, a beam of uniform intensity throughout will be passed through the objective lens and those dark shadows at the edge of the beam which are so common in prior practice and which have so uniformly interfered with efficient projection in machines of the character described are totally absent in apparatus of the present invention.

It should be borne in mind that when the film is frictionally driven in the manner described, the wear and tear occasioned by the use of a positive drive is entirely eliminated. In the apparatus shown in the drawings, the film is maintained in engagement with the sections 14ª and 14ᵇ of the drive roll 14 by the pressure rolls 15, which are forced into engagement with the film by a spring 99, as shown in Figure 1. The tension of this spring is sufficient to maintain proper traction between the film and the sections of the drive roll, so that there will be no appreciable slipping.

It will be understood, however, that even though slight slipping does occur, such slippage will be immediately compensated for by an automatic readjustment of the parts, i. e. by a speeding up of the film, so as not to impair the efficiency of the apparatus. Friction drives for films have been heretofore suggested, but have proven wholly impractical for the simple reason that in the absence of automatic compensating means, such, for example, as that shown in the drawings, the slightest slipping of the film will throw the parts so far out of synchronism as to seriously interfere with the projection of the images. These prior devices have been useless from a practical standpoint.

While I prefer to employ a friction drive for the film, I do not restrict the invention to such drive as sprockets may be employed for driving the film by slightly changing the construction shown in the drawings.

It will be understood from the foregoing detailed description that the light beam after passing through the film includes an image at all points in its length, and it is for the purpose of centralizing this image, as stated, that the present invention functions. In motion picture projection there is an image on the film, a like image in the projected beam and the ultimate image on the screen. The image in the beam must be centralized with respect to the objective lens, otherwise dark shadows will show on the image on the screen. The present invention will show efficiently centralized this image in the beam and the shadows or lines to which I have referred will not appear upon the screen.

In the foregoing detailed description and in the accompanying drawings, the illustration has been described and shown as utilized in conjunction with motion picture projecting machines employing a continuously moving film and continuously moving deflectors. I am aware, however, that the present invention is capable of employment in conjunction with intermittent movement machines, i. e., machines wherein the film is moved intermittently and pictures projected during periods of rest or dwell of the film. In machines of this latter character, the invention would manifestly be employed more in the nature of framing means, as will be apparent to those skilled in the art.

I intend to shortly file an application on specific mechanism for employing the present invention commercially in machines of the intermittent type.

For the reasons given, the present invention is to be understood as not restricted to the specific details of construction shown, but rather as broadly novel as is commensurate with the appended claims.

Having thus fully described the invention, what I claim as new and desire to secure by Letters Patent is:

1. In an apparatus for projecting motion pictures, an objective lens, and means, including moving deflectors, for passing a beam of light through a film and through the objective lens, in combination with means for driving the deflectors and film continuously, means for diverting portions of the beam of light after it passes through the film, and means, controlled by such diverted portions of the beam for controlling the relative speed between the film and deflectors for the purpose of maintaining the image in the beam substantially centralized with respect to the objective lens.

2. In an apparatus for projecting motion pictures, an objective lens, and means, including moving deflectors, for passing a beam of light through a film and through the objective lens, in combination with means for diverting opposite marginal portions of the light beam after it has passed through the film, variable electrical resistance cells upon which the diverted portions of the beam are directed, and means, controlled by the relative resistance of said cells, under varying degrees of illumination, for automatically controlling the relation of the speeds of the deflectors and film.

3. In an apparatus for projecting motion pictures, an objective lens, and means, including moving deflectors, for passing a beam of light through a film and through the objective lens, in combination with means for driving the deflectors and film through changeable speed connections, means for diverting portions of the beam of light after it leaves the film, and variable electrical resistance, means operatively connected with said changeable speed connections and controlled by said diverted portions of the beam for automatically regulating said changeable speed connections, whereby the relation between the speeds of operation of the deflectors and film are automatically controlled.

4. In an apparatus for projecting motion pictures, an objective lens, and means, including moving deflectors, for passing a beam of light through a film and through the objective lens, in combination with means for driving the deflectors and film through changeable speed connections, means for diverting opposite marginal portions of the light beam after the beam has passed through the film, variable electrical resistance cells upon which said diverted portions of the beam are directed, electrical connections including said cells and operatively connected to said changeable speed connections for the purpose of automatically controlling said connections, with the electrical connections of the cell of one diverted portion of the beam electrically balanced with respect to the electrical connection of the cell of the other diverted portion of the beam when the image in the beam is substantially centralized with respect to the objective lens, to provide at such times the relative speeds of deflectors and film necessary to maintain such centralizing of said image, whereby shifting of said image out of centralized relation to the lens will automatically effect a relative change in speed between the deflectors and film for the purpose of restoring the image to centralized position.

5. In an apparatus for projecting motion pictures, an objective lens, and means, including moving deflectors, for passing a beam of light through a film and through the objective lens, in combination with means for operating the deflectors at a substantially uniform speed, means, including a pair of alined frusto conical sections, engaging with the margins for driving said film, means for rotating said sections at a substantially uniform speed, and means, automatically controlled by the beam of light passing through the objective lens, for shifting said sections axially with respect to one another and to the film for the purpose of varying the linear speed of the film.

6. In an apparatus for projecting motion pictures, an objective lens, and means, including moving deflectors, for passing a beam of light through a film and through the objective lens, in combination with means for operating the deflectors at a substantially uniform speed, means, including a pair of alined frusto conical sections, engaging with the margins for driving said film, means for rotating said sections at a substantially uniform speed, means for diverting opposite marginal edges of the beam of light after it has passed through the film, variable electrical resistance cells upon which the diverted portions of the beam are directed, and means, controlled by the relative resistance of said cells, under varying degrees of illumination, for automatically shifting said sections axially with respect to one another and to the film for the purpose of varying the linear speed of the film.

7. In an apparatus for projecting motion pictures, an objective lens, and means, including moving deflectors, for passing a beam of light through a film and through the objective lens, in combination with means for driving the deflectors, at a substantially uniform speed, a pair of alined frusto conical drive members engaging with the film, means for rotating said members at a substantially uniform speed, speed regulating mechanism for moving said members axially toward and away from one another to vary the speed at which the film is driven, and means, automatically controlled by the beam of light after its passage through the film, for controlling the operations of said speed regulating mechanism.

8. In an apparatus for projecting motion pictures, an objective lens, and means, including moving deflectors, for passing a beam of light through a film and through the objective lens, in combination with means for driving the deflectors, at a substantially uniform speed, a pair of alined frusto conical drive members engaging with the film, means for rotating said members at a substantially uniform speed, speed regulating mechanism for moving said members axially toward and away from one another to vary the speed at which the film is driven, means for diverting marginal portions of the beam of light after it has passed through the film, and means, automatically operable by said diverted portions of light, for controlling the operations of said speed regulating mechanism.

9. In an apparatus for projecting motion pictures, an objective lens, and means, including moving deflectors, for passing a beam of light through a film and through the objective lens, in combination with means for driving the deflectors, at a substantially uniform speed, a pair of alined frusto conical drive members engaging with the film, means for rotating said members at a substantially uniform speed, speed regulating mechanism for moving said members axially toward and away from one another to vary the speed at which the film is driven, means for diverting marginal portions of the beams of light after it has passed through the film, and variable electrical resistance means controlled by said diverted portions of the beam and operatively connected to said regulating mechanism to control the operations thereof.

10. In an apparatus for projecting motion pictures, an objective lens, and means, including moving deflectors, for passing a beam of light through a film and through the objective lens, in combination with means for driving the deflectors, at a substantially uniform speed, a pair of alined frusto conical drive members engaging with the film, means for rotating said members at a substantially uniform speed, speed regulating mechanism for moving said members axially toward and away from one another to vary the speed at which the film is driven, means for diverting marginal portions of the beam of light after it has passed through the film, variable electrical resistance cells upon which the diverted portions of the beam are directed, and means, controlled by the variable resistance of said cells, under varying degrees of illumination, for automatically controlling the operation of the speed regulating mechanism.

11. In an apparatus for projecting motion pictures, an objective lens, and means, including moving deflectors, for passing a beam of light through a film and through the objective lens, in combination with means for driving the deflectors continuously, means for diverting portions of the beam of light after it passes through the film, means for varying the speed of the film, and means controlled by the diverted portions of the beam for regulating the means which controls the speed of the film.

12. In an apparatus for projecting motion pictures, an objective lens, and means, including moving deflectors, for passing a beam of light through a film and through the objective lens, in combination with means for diverting portions of the beam of light after it passes through the film, means for driving the film, and differential control means automatically regulated by differences in illuminating values of the diverted portions of the beam for controlling the speed of travel of the film.

13. In an apparatus for projecting motion pictures, an objective lens, and means, including moving deflectors, for passing a beam of light through a film and through the objective lens, in combination with means for diverting opposite marginal portions of the beam of light after it is passed through the film, means for balancing the illuminating value of one of said diverted portions with the beam against the illuminating value of the other for the purpose of producing differential forces, and film driving means controlled by said differential forces for driving the film at a thus controlled speed.

In testimony whereof I have signed the foregoing specification.

WILHO A. KOSKEN.